(12) United States Patent
Kasar (10) Patent No.: US 9,805,864 B2
(45) Date of Patent: Oct. 31, 2017

(54) INDUCTIVE SPRING SYSTEM

(71) Applicant: Apple Inc., Cupertino, CA (US)

(72) Inventor: Darshan R. Kasar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 881 days.

(21) Appl. No.: 14/245,617

(22) Filed: Apr. 4, 2014

(65) Prior Publication Data

US 2015/0287527 A1    Oct. 8, 2015

(51) Int. Cl.
*H01F 38/14* (2006.01)
*H04B 5/00* (2006.01)
*H02J 5/00* (2016.01)

(52) U.S. Cl.
CPC ........... *H01F 38/14* (2013.01); *H04B 5/0031* (2013.01); *H04B 5/0037* (2013.01); *H04B 5/0075* (2013.01); *H01F 2038/146* (2013.01); *H02J 5/005* (2013.01)

(58) Field of Classification Search
CPC .... H01F 38/14; H01F 2038/146; H01F 27/36; H01F 1/147; H01F 1/14; H01F 1/44; H01F 1/37; H01F 1/34; H01F 27/04; H01F 27/02; H01F 27/28; H04B 5/0031; H04B 5/0037; H04B 5/0075; H02J 5/005; H02J 7/00; H02J 17/00
USPC ................................ 333/12, 24 R, 177, 180
See application file for complete search history.

(56) References Cited

U.S. PATENT DOCUMENTS

| | | |
|---|---|---|
| 4,612,467 A | 9/1986 | Clegg |
| 5,198,647 A | 3/1993 | Mizuta |
| 5,305,961 A | 4/1994 | Errard et al. |
| 5,719,483 A | 2/1998 | Abbott et al. |
| 6,975,198 B2 | 12/2005 | Baarman et al. |
| 7,180,265 B2 | 2/2007 | Naskali et al. |
| 7,477,128 B2 | 1/2009 | Quilici |
| 7,830,116 B2 | 11/2010 | Toya et al. |
| 7,948,208 B2 | 5/2011 | Partovi et al. |
| 7,952,322 B2 | 5/2011 | Partovi et al. |
| 8,169,185 B2 | 5/2012 | Partovi et al. |

(Continued)

FOREIGN PATENT DOCUMENTS

| | | |
|---|---|---|
| CN | 101867203 | 10/2010 |
| CN | 102377250 | 3/2012 |

(Continued)

*Primary Examiner* — Benny Lee
*Assistant Examiner* — Hafizur Rahman
(74) *Attorney, Agent, or Firm* — Kilpatrick Townsend and Stockton, LLP (57) ABSTRACT

An electrical connector system for communication or power transfer between a two connectors in which the first of the two connectors may be inserted into a receptacle of a second connector in order to align a coil within the first connector with a coil within the second connector to promote inductive communication between the first and second connector. In many embodiments, at least one of the two coils may also be used as a spring, providing a mechanical force. The mechanical force may assist in joining or separating the connectors. For example, the spring coil may be used in conjunction with a push-push mechanism to retain the first connector within the second connector and to eject the first connector when the connectors should be separated.

23 Claims, 9 Drawing Sheets

(56) References Cited

U.S. PATENT DOCUMENTS

| | | | |
|---|---|---|---|
| 8,193,769 B2 | 6/2012 | Azancot et al. | |
| 8,229,356 B2 | 7/2012 | Kawamura | |
| 8,406,823 B2 | 3/2013 | Kondo et al. | |
| 8,421,574 B2 | 4/2013 | Suzuki et al. | |
| 8,482,160 B2 | 7/2013 | Johnson et al. | |
| 8,587,516 B2 | 11/2013 | Kopychev et al. | |
| 8,629,652 B2 | 1/2014 | Partovi et al. | |
| 8,629,654 B2 | 1/2014 | Partovi et al. | |
| 8,643,461 B2 | 2/2014 | Lim et al. | |
| 8,754,609 B2 | 6/2014 | Tsai et al. | |
| 8,760,255 B2 | 6/2014 | Yang et al. | |
| 8,796,989 B2 | 8/2014 | Lee et al. | |
| 8,844,817 B2 | 9/2014 | Glanzer et al. | |
| 8,845,590 B2 | 9/2014 | Ash | |
| 8,890,369 B2 | 11/2014 | Baarman et al. | |
| 8,890,470 B2 | 11/2014 | Partovi | |
| 8,896,264 B2 | 11/2014 | Partovi | |
| 8,901,881 B2 | 12/2014 | Partovi | |
| 8,912,686 B2 | 12/2014 | Stoner et al. | |
| 8,922,065 B2 | 12/2014 | Sun et al. | |
| 8,922,162 B2 | 12/2014 | Park et al. | |
| 8,947,041 B2 | 2/2015 | Cook et al. | |
| 8,947,042 B2 | 2/2015 | Kirby et al. | |
| 8,947,047 B2 | 2/2015 | Partovi et al. | |
| 9,054,417 B2 | 6/2015 | Lin | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,118,193 B2 | 8/2015 | Yeh | |
| 9,124,308 B2 | 9/2015 | Metcalf et al. | |
| 9,130,408 B2 | 9/2015 | Ichikawa | |
| 9,160,204 B2 | 10/2015 | Yeh | |
| 9,178,369 B2 | 11/2015 | Partovi | |
| 9,190,849 B2 | 11/2015 | Won et al. | |
| 9,246,214 B2 | 1/2016 | Pope et al. | |
| 2005/0288743 A1 | 12/2005 | Ahn et al. | |
| 2006/0049481 A1 | 3/2006 | Tiemeijer | |
| 2010/0253153 A1 | 10/2010 | Kondo et al. | |
| 2010/0259401 A1* | 10/2010 | Azancot | H01F 38/14 340/657 |
| 2011/0050164 A1 | 3/2011 | Partovi et al. | |
| 2011/0143556 A1 | 6/2011 | Hsu | |
| 2011/0221385 A1 | 9/2011 | Partovi et al. | |
| 2012/0098484 A1 | 4/2012 | Cheng et al. | |
| 2013/0026981 A1 | 1/2013 | Van Der Lee et al. | |
| 2013/0069595 A1 | 3/2013 | Rejman et al. | |
| 2013/0093388 A1 | 4/2013 | Partovi | |
| 2013/0099563 A1 | 4/2013 | Partovi et al. | |
| 2013/0107126 A1 | 5/2013 | Nonomura et al. | |
| 2013/0119926 A1 | 5/2013 | Lin | |
| 2013/0127252 A1 | 5/2013 | Yerazunis et al. | |
| 2013/0127406 A1 | 5/2013 | Winger et al. | |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0021909 A1 | 1/2014 | Klawon et al. | |
| 2014/0083997 A1 | 3/2014 | Chen et al. | |
| 2014/0103873 A1 | 4/2014 | Partovi et al. | |
| 2014/0132210 A1 | 5/2014 | Partovi | |
| 2014/0191568 A1 | 7/2014 | Partovi | |
| 2014/0206372 A1 | 7/2014 | Zeng et al. | |
| 2014/0306654 A1 | 10/2014 | Partovi | |
| 2015/0130412 A1 | 5/2015 | Partovi | |
| 2015/0145475 A1 | 5/2015 | Partovi et al. | |
| 2015/0302971 A1 | 10/2015 | Wagman et al. | |
| 2015/0311740 A1 | 10/2015 | Hilario et al. | |
| 2016/0064137 A1 | 3/2016 | Perez et al. | |
| 2016/0094076 A1 | 3/2016 | Kasar | |
| 2016/0094078 A1 | 3/2016 | Graham et al. | |

FOREIGN PATENT DOCUMENTS

| | | |
|---|---|---|
| CN | 103168405 | 6/2013 |
| CN | 103378639 | 10/2013 |
| EP | 2535906 | 12/2012 |
| EP | 2597747 | 5/2013 |
| EP | 2621050 | 7/2013 |
| EP | 2693591 | 2/2014 |
| FR | 2883428 | 9/2006 |
| JP | 58087804 | 5/1983 |
| JP | 08079976 | 3/1996 |
| JP | 2008210862 | 9/2008 |
| WO | WO03/105311 | 12/2003 |
| WO | WO2013/165167 | 11/2013 |

* cited by examiner

INDUCTIVE SPRING SYSTEM

TECHNICAL FIELD

Embodiments described herein generally relate to electrical connectors, and more particularly to electrical connectors providing both an electrical coupling and a mechanical connection.

BACKGROUND

Many connectors may provide either electrical or mechanical connections between two elements. For examples, screws, bolts, and nails may mechanically fasten one object to another, providing a mechanical connection between the two. Likewise, solder, flexible circuits, and electrical traces and the like may provide electrical connections between two elements, facilitating electronic communication and/or power transmission between them.

Generally, however, different connectors are used to provide mechanical and electrical connection between two elements. Using multiple connectors of different types may require additional space to form the connections with the housing of an electronic device and may be inefficient in terms of component layout, especially for small form factor devices.

Accordingly, there may be a present need for improved connectors for electronic devices.

SUMMARY

Embodiments described herein may relate to or take the form of an electrical connector system for communication (e.g., data transfer) or power transfer between a first and second connector.

In certain embodiments, the first connector may include at least an insert portion and a first electromagnetic coil within the insert portion. A second connector may include at least a receptacle sized to receive the insert portion of the first connector and may also include a second electromagnetic coil adapted or configured to compress to a selected dimension (e.g., length, height, diameter, width, cross sectional area, etc.) in response to receiving the insert portion within the receptacle.

In this manner, the second electromagnetic coil may provide both electrical and mechanical features, functioning as both an inductor and a spring. In many embodiments, the selected dimension may be based, at least in part, on a mutual inductance characteristic (e.g., length, turn ratio, cross sectional area, separation between inductors, etc.) between the first electromagnetic coil and the second electromagnetic coil when the insert portion is received in the receptacle. In many cases, the insert portion and the receptacle may be cylindrical, although other complementary shapes suitable for mating are contemplated.

Further embodiments may include a configuration in which the second connector houses a latch configured to retain the first connector within the receptacle of the second connector. For example, the latch in the second connector may interface or interlock with a receiving feature or recess within the first connector. In certain examples, the latch and interlock mechanism may at least temporality retain the first connector within the second connector. In some embodiments, the latch and interlock mechanism may be a push-push mechanism. In other embodiments, the latch may include a detent and/or recess.

Further embodiments may include a configuration in which the first electromagnetic coil may be configured to compress to a selected dimension (e.g., length, height, diameter, width, etc.) in response to insertion into the receptacle, and wherein the selected dimension is based at least in part on a mutual inductance characteristic (e.g., length, turn ratio, cross sectional area, separation between inductors, etc.) between the first electromagnetic coil and the second electromagnetic coil when the insert portion is received in the receptacle. In this manner, the both connectors may include an electromagnetic coil to provide both electrical and mechanical features, each of the two electromagnetic coils functioning as both an inductor and a mechanical spring.

In many embodiments, the connector system may be adapted for inductive power transfer between the several coils. In certain embodiments, the connector system may be adapted for electromagnetic signal transfer (e.g., data exchange, digital communication, inductive communication, etc.). In still further embodiments, the connector system may be adapted to transfer both power and data across the inductive interface between the first electromagnetic coil and second electromagnetic coil.

Further embodiments may include a configuration in which the second connector further also includes at least a third electromagnetic coil configured to compress to a second selected dimension in response to receiving the insert portion within the receptacle, wherein the second selected dimension is based at least in part on a mutual inductance characteristic between the first electromagnetic coil and the third electromagnetic coil when the insert portion is received in the receptacle, and wherein the second selected dimension is distinct from the first selected dimension. In this manner, the insert portion may be inserted at two or more distinct pressures or two or more distinct depths to provide two or more distinct mutual inductance characteristics for power transfer or data transfer. For example, the insert portion may be inserted to a first depth controlled by compression of the second electromagnetic coil and may be further inserted to a second depth controlled by compression of the third electromagnetic coil. In further embodiments, second depth may be provided and defined by a spring disconnected from electronic circuitry.

Other embodiments described herein may relate to or take the form of an electrical connector system for communication (e.g., data transfer) or power transfer between a first and second connector. In such embodiments, the first connector may include at least a housing and a first electromagnetic coil positioned within the housing and configured to compress to a first selected dimension (e.g., length, height, diameter, width, cross sectional area, etc.) in response to a compressive force applied to the housing. The second connector may include a receptacle sized to receive the housing of the first connector and a second electromagnetic coil positioned around the receptacle. In these embodiments, the first selected dimension may be based at least in part on a mutual inductance characteristic (e.g., length, turn ratio, cross sectional area, separation between inductors, etc.) between the first electromagnetic coil and the second electromagnetic coil when the insert portion is received in the receptacle. In many cases, the housing and the receptacle may each be cylindrical, although other complementary shapes suitable for mating are contemplated.

Embodiments described herein may also relate to or take the form of methods of electromagnetic transmission including at least the steps of positioning a first electromagnetic coil inductively proximate a second electromagnetic coil, compressing the second electromagnetic coil to a selected dimension (e.g., length, height, diameter, width, cross sectional area, etc.), and varying a magnetic field in the first electromagnetic coil, wherein the selected dimension is based at least in part on a mutual inductance characteristic (e.g., length, turn ratio, cross sectional area, separation between inductors, etc.) between the first electromagnetic coil and the second electromagnetic coil when the second electromagnetic coil is compressed to a selected depth.

In these and related embodiments, the first electromagnetic coil may be disposed within a housing, and the second electromagnetic coil may be disposed within a receptacle sized to receive the housing.

These and related embodiments may also include a step of at least temporarily fixing the position of the first electromagnetic coil relative to the second electromagnetic coil. For example, one embodiment may include latching the first electromagnetic coil with a latch mechanism such as a push-push mechanism These and related embodiments may include a configuration in which the first electromagnetic coil is fixed relative to the second electromagnetic coil by twisting or tightening the second electromagnetic coil around the first electromagnetic coil.

Many embodiments may include a configuration in which one or more of the electromagnetic coils are made from a copper alloy suitable for elastic deformation.

Other embodiments described herein may relate to or take the form of methods of electromagnetic transmission of power, data, or both including at least the steps of positioning a first electromagnetic coil within a second electromagnetic coil, tightening the second electromagnetic coil to a selected diameter so as to at least partially restrain the first electromagnetic coil within the second electromagnetic coil, varying a magnetic field in the first electromagnetic coil to induce a voltage within the second electromagnetic coil, loosening the second electromagnetic coil, removing the first electromagnetic coil from the second electromagnetic coil

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

DETAILED DESCRIPTION

Embodiments described herein may relate to or take the form of an electrical connector system for communication (e.g., data transfer) or power transfer between a two connectors in which the first of the two connectors may be inserted into a receptacle of a second connector in order to align a coil within the first connector with a coil within the second connector to promote inductive communication between the first and second connector.

In many embodiments, at least one of the two coils may also be used as a spring, providing a mechanical force. The mechanical force may assist in joining or separating the connectors. For example, the spring coil may be used in conjunction with a push-push mechanism similar to a retractable pen to retain the first connector within the second connector and to eject the first connector when the connectors should be separated.

In these and related embodiments the spring coil may be adapted to compress to a position having known inductive properties. For example, the coil may compress such that each turn of the spring touches a surface of an adjacent turn. In this manner, when the first and second connectors are mated, the spring coil may be in a position to inductively communicate with the other coil.

In some examples, the first and second coils may be adapted to transfer electrical power inductively. For example, one connector may be included within a portable electronic device including a rechargeable battery and the other connector may be included within a charging dock or base station. In this manner, the connector system may serve as an inductive charging interface.

An inductive charging system may include an inductive power transmitting apparatus (e.g., dock) to transmit power and a portable electronic device or accessory to receive power. Such electronic devices may include media players, media storage devices, personal digital assistants, tablet computers, cellular telephones, laptop computers, smart phones, styluses, global positioning sensor units, remote control devices, wearable devices, electric vehicles, home appliances, home automation devices, medical devices, health devices, sports devices and so on.

In many examples, when a power-receiving inductor (i.e., "receive coil") within portable electronic device is placed inductively proximate a power-transmitting inductor (i.e., "transmit coil") of an inductive power transmitting dock, the portable electronic device may activate inductive charging circuitry including a power-receiving inductor (i.e., "receive coil") and may communicate to the inductive power transmitting apparatus that the portable electronic device is ready to receive power. In other words, when the receive coil is positioned adjacent to, within, or around the transmit coil, inductive power transfer may occur.

In these embodiments current may be induced in the receive coil by applying an alternating or switched current to the transmit coil. The portable electronic device may use the received current to replenish the charge of the one or more rechargeable batteries.

For example, a power transmitting coil may inductively couple with a power receiving coil mechanically. Mechanical coupling may be useful to maintain the positioning of the power transmit coil relative to the power receiving coil. One may appreciate that maintaining the relative positioning of the coils may increase consistency in the power transfer between the power transmitting coil and the power receiving coil. One may further appreciate that the coils are preferable positioned inductively proximate one another. For one example, a power transmitting coil may be positioned within a power receiving coil. In another example, a power transmitting coil may be positioned around a power receive coil (i.e., the power receiving coil positioned within the power transmitting coil). In still further examples, a power transmitting coil may be positioned near a power receive coil.

Mechanical coupling of the power transmitting coil and the power receiving coil may be accomplished in a number of ways. The power receiving coil may be mechanically coupled to the power receiving coil with a latch or screw. In another example, the power receiving coil may be used as a spring within a push-push mechanism. In this example, the power transmitting coil may be included within a first connector insertable into a receptacle of a second connector. The power receiving coil may be positioned around the receptacle such that when the first connector is inserted therein, the power transmitting coil may be within the power receiving coil. In certain embodiments, the power receiving coil may also be used as a compressible spring. In such examples, when the first connector and second connector are not mated, the power receiving coil may be in an expanded state. When the first connector is inserted therein, the power receiving coil may compress. In certain embodiments, the power receiving coil may fully compress. In these examples, once the power receiving coil compresses to a certain height, a retaining mechanism may be engaged such that the first connector is mechanically retained within the second connector. In one example, the retaining mechanism may be a cam-follower associated with a push-push mechanism.

Although many embodiments described herein may refer to a receive coil as functioning also as a spring mechanism, it is understood that the transmit coil may also function as a spring mechanism. Similarly, although many embodiments described herein refer to inductive charging between a transmit coil and a receive coil, it is understood that other electronic relationships between the first and second connector are contemplated. For example, instead of, or in addition to, inductive power transfer, a first and second connector may inductively communicate by transferring data therebetween.

Still further embodiments described herein may include a configuration in which a spring mechanism may carry an electrical charge or signal. For example, in certain embodiments, a spring mechanism may be an inductor associated with an electrical circuit, such as a resonant circuit. In other examples, a spring mechanism may carry an electrical signal from one portion of an electrical circuit to another portion of an electrical circuit. For example, a spring mechanism in a laptop hinge may carry an electrical signal from a main logic board to a pivoting display portion. In these examples, a spring mechanism may be constructed of copper, copper alloy, or another electrically conductive and mechanically elastic material. In these examples, an electrically conductive spring mechanism may be resistant to material fatigue, deformation, permanent bending, or other dynamic failures.

In still further examples, a conductive spring mechanism may include one or more taps that connect or couple to different electrical circuits. For example, a spring mechanism may include one or more sensors coupled to one or more locations along the spring mechanism. The sensors may, in some embodiments, be coupled to an electrical circuit via the spring mechanism such that the spring mechanism forms a portion of the sensor circuit.

In still further embodiments, a conductive spring mechanism may carry an electrical signal from circuit to another circuit. For example, the electrical signal may be digital data or, in other embodiments, the electrical signal may be an analog electrical signal. In these examples, the conductive spring mechanism may serve as an electrically conductive coupling while also serving as a flexible portion of a housing or other structural member that is resilient to material fatigue, deformation, permanent bending, or other dynamic failures.

Figure 1:
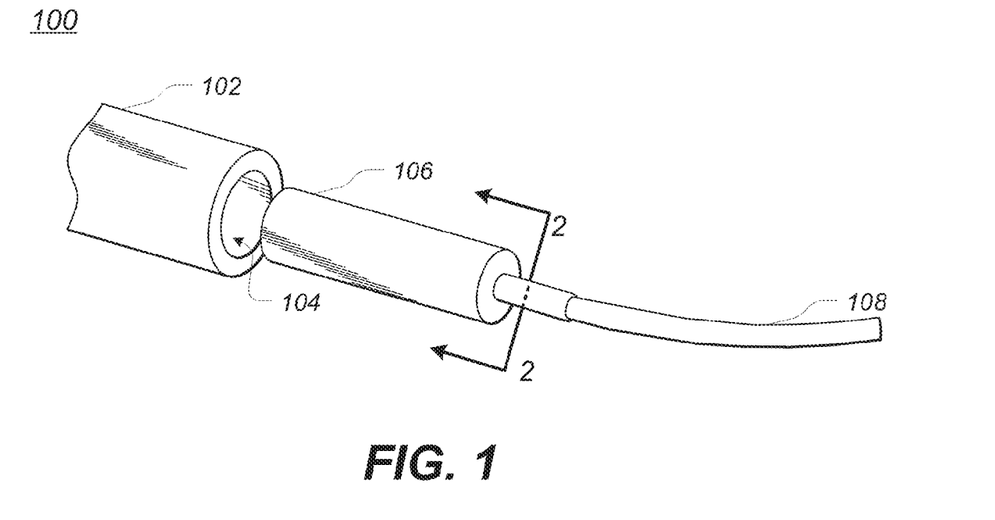
FIG. 1 depicts a perspective view of an example electrical connector system.

FIG. 1 depicts a perspective view of an example electrical connector system 100. The electrical connector system 100 may include a first connector 102 that may include an aperture or receptacle 104 that may be sized to receive a second connector 106. The receptacle 104 and the second connector 106 may have complementary geometry. For example as illustrated both the receptacle 104 and the second connector 106 take a substantially cylindrical shape. In other examples, both the receptacle 104 and the second connector 106 may take a rectangular or oblong shape. In still further embodiments, the receptacle 104 may be concave and the second connector 106 may be convex. In many examples, the second connector 106 may include a cable portion 108. The cable portion 108 may couple the second connector to an electrical circuit.

Figure 2:
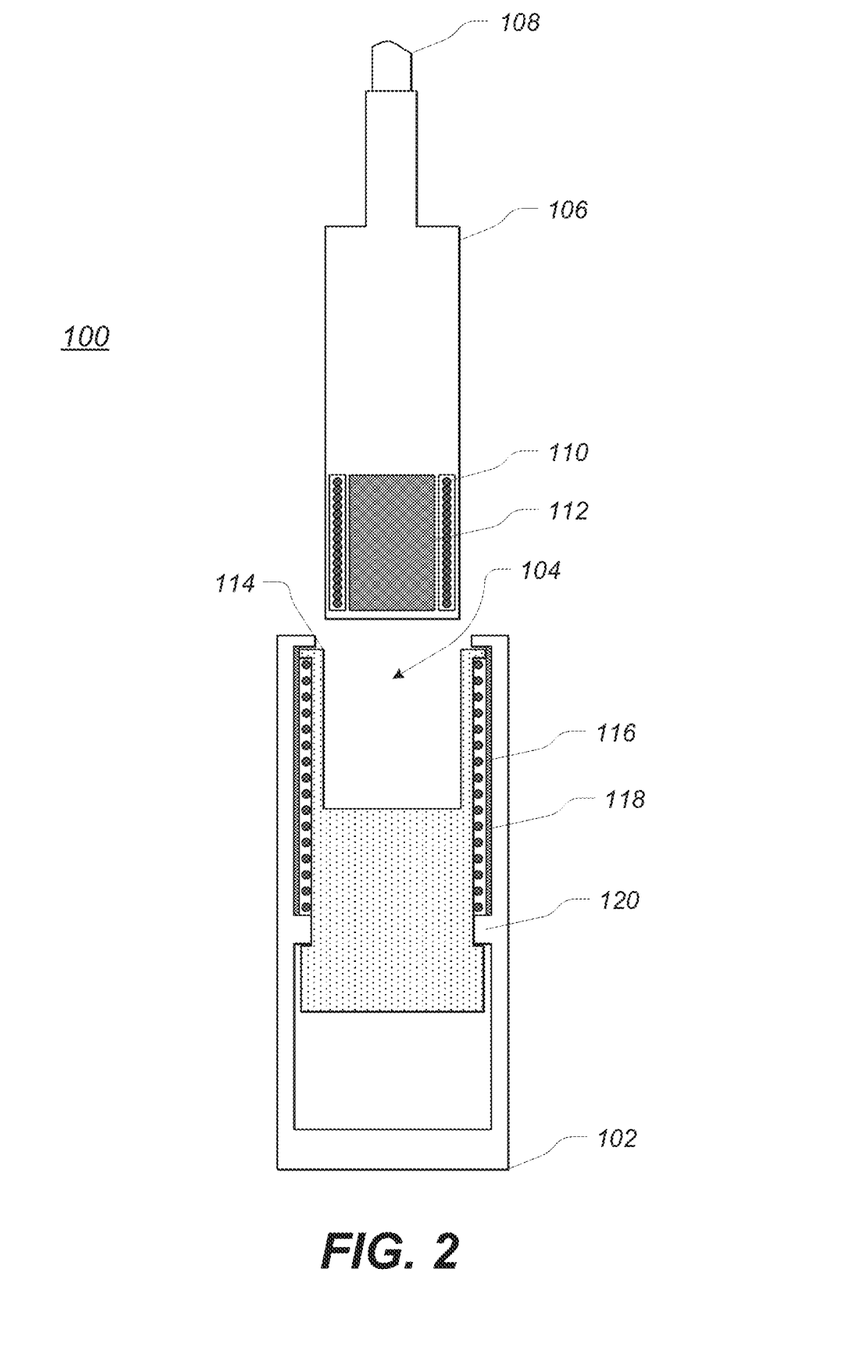
FIG. 2 depicts a side cross section view of the example electrical connector system of FIG. 1 taken along line 2-2, showing an inductive spring element of a connector receptacle in an expanded configuration.

FIG. 2 depicts a side cross section view of the example electrical connector system 200 of FIG. 1 taken along line 2-2, showing an inductive spring element 116 of a connector 102. The inductive spring 116 is illustrated in an expanded position. The inductive spring 116 may be positioned to provide mechanical resistance to compression between a retractable sheath 114 and a shelf portion 120 of the connector 102. In this manner, when the retractable sheath 114 is pushed further into the receptacle 104, the inductive spring element 116 may compress against the shelf portion 120, and the inductive spring 116 itself may compress along a dimension. As illustrated, the inductive spring 116 may compress vertically. One may appreciate that, depending on the material selected for the inductive spring 116, the inductive spring 116 may expand or contract along alternate or additional dimensions upon compression. For example, if the inductive spring is cylindrical, the diameter of the circular cross section of the inductive spring 116 may slightly increase as the inductive spring is compressed along the Z-axis.

In many embodiments, the inductive spring 116 may be constructed of a material suitable for compression and for electrical conductivity. For example, in certain embodiments, the inductive spring 116 may be made from a copper alloy. In other embodiments, the inductive spring 116 may be made from several layers of conducting material. For example, a copper layer may surround a steel core. In still further examples, the inductive spring 116 may be coated with an electrically insulating coating layer. The coating may be plastic, polymer, varnish, acrylic, or any other suitable electrically insulating coating. One may appreciate that the coating layer may be included in order to prevent adjacent turns of the inductive spring 116 from electrically shorting upon compression of the spring.

As noted, the connector 106 may be sized to be received within the receptacle 104 and within the geometry of the retractable sheath 114. In this manner, when the connector 106 is inserted into the receptacle 104 and the retractable sheath 114, the inductive spring 116 may compress. The retractable sheath 114 and the connector 106 may take any number of suitable and complimentary geometries. For example as illustrated both the retractable sheath 114 and the connector 106 take a substantially cylindrical shape. In other examples, both the retractable sheath 114 and the second connector 106 may take a rectangular or oblong shape. In still further embodiments, the retractable sheath 114 114 may be concave and the second connector 106 may be convex.

In many embodiments, a low-friction layer 118 may ease the sliding of the retractable sheath 114 into the receptacle 104. In other examples, the low-friction layer 118 may be adapted for electromagnetic shielding. For example, the low-friction layer 118 may substantially or partially redirect flux generated by the inductive spring 116 into an inductive coil 110, which may be positioned within the connector 106. The inductive coil 110 may be positioned around a core element 112. In some examples, the core element 112 may be made from a ferromagnetic material, such as steel, ferrite, or other nickel, zinc, or manganese compounds and alloys.

Figure 3:
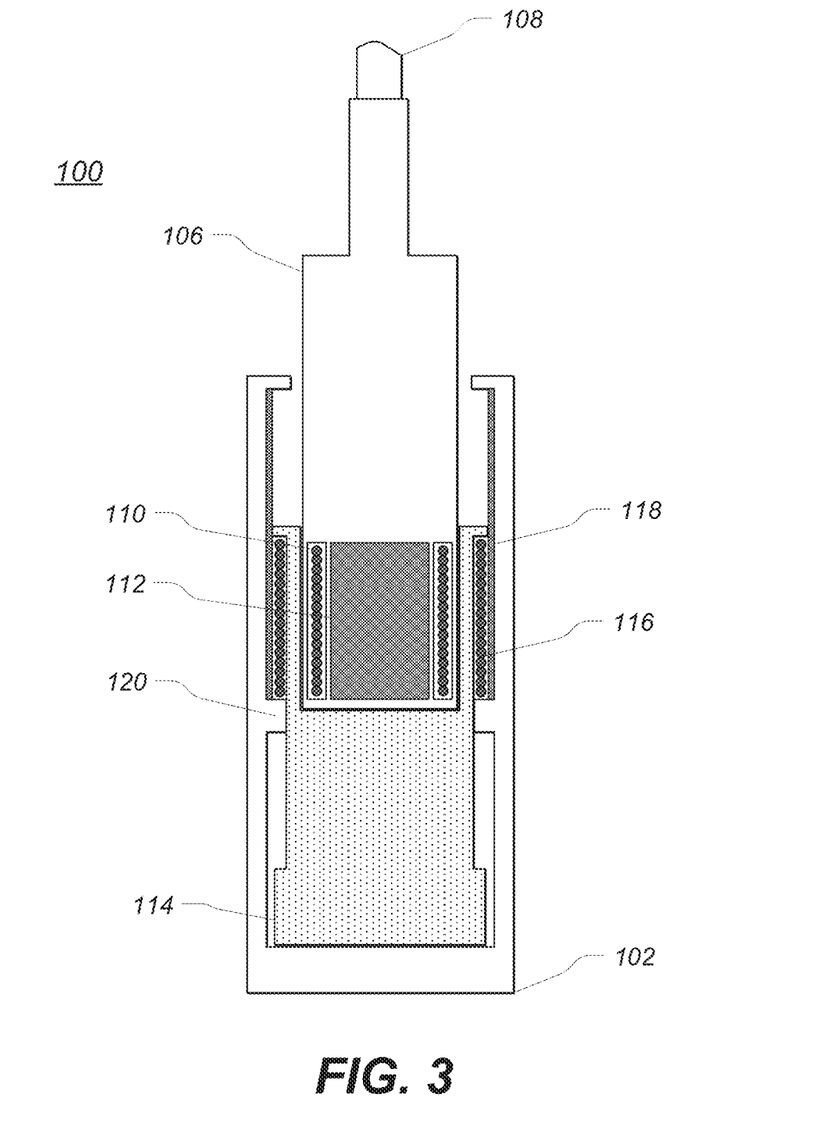
FIG. 3 depicts a side cross section view of the example electrical connector system of FIG. 1 taken along line 2-2, showing an inductive spring element of a connector receptacle in a compressed configuration.

FIG. 3 depicts a side cross section view of the example electrical connector system 100 of FIG. 1 taken along line 2-2, showing an inductive spring element of a connector receptacle in a compressed configuration. As shown, the connector 106 is received at least partially within the receptacle 104, causing a retraction of the retractable sheath 114 which in turn may compress the inductive spring 116. In this manner, the cores of the inductive spring 116 and the inductive coil 110 may be aligned in inductive communication. In other words, the inductive spring 116 and the inductive coil 110 may be inductively coupled. The electrical connector system may also include a retaining mechanism that may be engaged such that the first connector is mechanically retained within the second connector. In one example, the retaining mechanism may be a cam-follower associated with a push-push mechanism.

Figure 4:
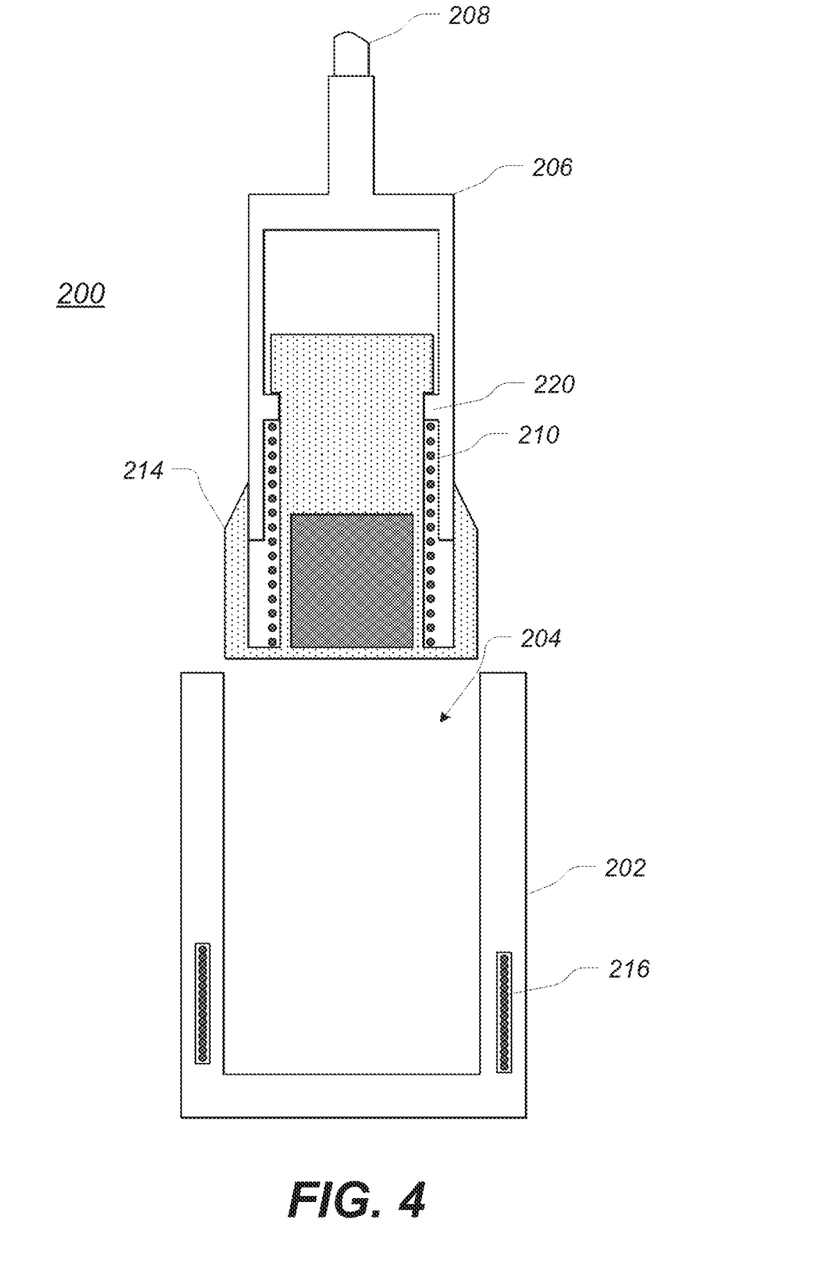
FIG. 4 depicts a side cross section view of an example electrical connector system related to the example electrical connector system as shown in FIG. 1 taken along line 2-2, showing an inductive spring element of an insert portion in an expanded configuration.

FIG. 4 depicts a side cross section view of an example electrical connector system 200 related to the example electrical connector system 100 as shown in FIG. 1 taken along line 2-2, showing an inductive spring 210 within a retractable sheath 214 of a first connector 206 that is sized to be inserted within a receptacle 204 of a second connector 202. Upon insertion of the first connector 206 within the second connector 202, the inductive spring 210 may compress, causing the retractable sheath 214 to retract around the housing of the first connector 206. The inductive spring 210 may compress against a shelf portion 220 included within the interior of the housing of the first connector 206.

In this manner, when the first connector 206 and the inductive spring are fully compressed, the inductive spring 210 may be aligned with an inductive coil 216 within the second connector 202. The electrical connector system 200 may also include a retaining mechanism that may be engaged such that the first connector is mechanically retained within the second connector upon insertion. In one example, the retaining mechanism may be a cam-follower associated with a push-push mechanism.

Figure 5:
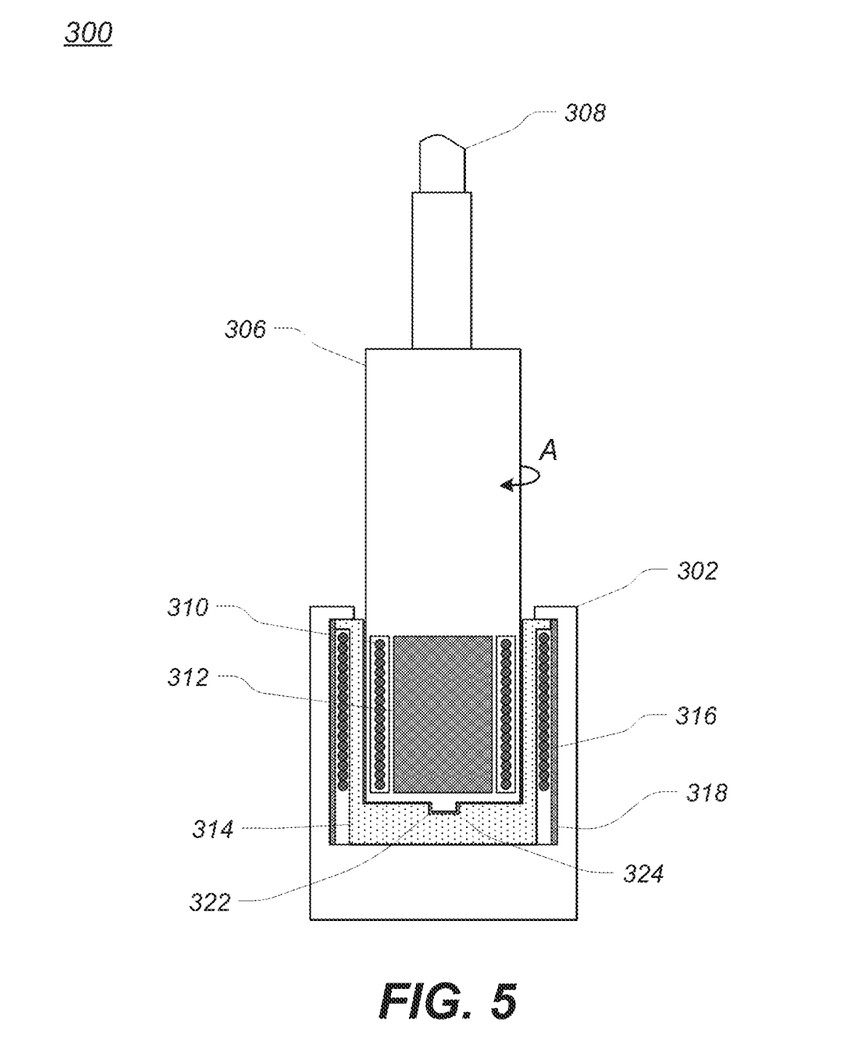
FIG. 5 depicts a side cross section view of an example electrical connector system related to the example electrical connector system as shown in FIG. 1 taken along line 2-2, showing an inductive spring element of a connector receptacle in a tightened configuration.

FIG. 5 depicts a side cross section view of an example electrical connector system 300 related to the example electrical connector system 100 as shown in FIG. 1 taken along line 2-2, with a first connector 302 having an inductive spring element 310 associated with a connector receptacle 314. The connector receptacle 314 may include a keyed portion 324. The connector receptacle 314 may be rotatable about an axis such that when rotated, the inductive spring element 310 may tighten or respectively loosen. In this manner, rotated in a tightening direction A, the inductive spring 310 may tighten about the connector receptacle 314 so as to grip the connector receptacle 314. A low-friction layer 318 may be disposed about the interior of the housing of the first connector 302 in order to facilitate easy rotation of the connector receptacle 314.

The connector receptacle 314 may be sized to receive a second connector 306 within it. The second connector 306 may include a tooth portion 322 that may be sized to fit within the keyed portion 324. In this manner, when the second connector 306 is inserted into the connector receptacle 314, the tooth 322 may align with the keyed portion 324. Then, the second connector 306 may be rotated in a tightening direction A. In this manner, the inductive spring 310 may tighten about the connector receptacle 314 which in turn may tighten about the second connector 306. The tightening of the connector receptacle 314 mechanically retains the second connector within the first connector. In this manner, the cores of the inductive spring 310 and the inductive coil 316 may be aligned in inductive communication. In other words, the inductive spring 310 and the inductive coil 316 may be inductively coupled.

Figure 6:
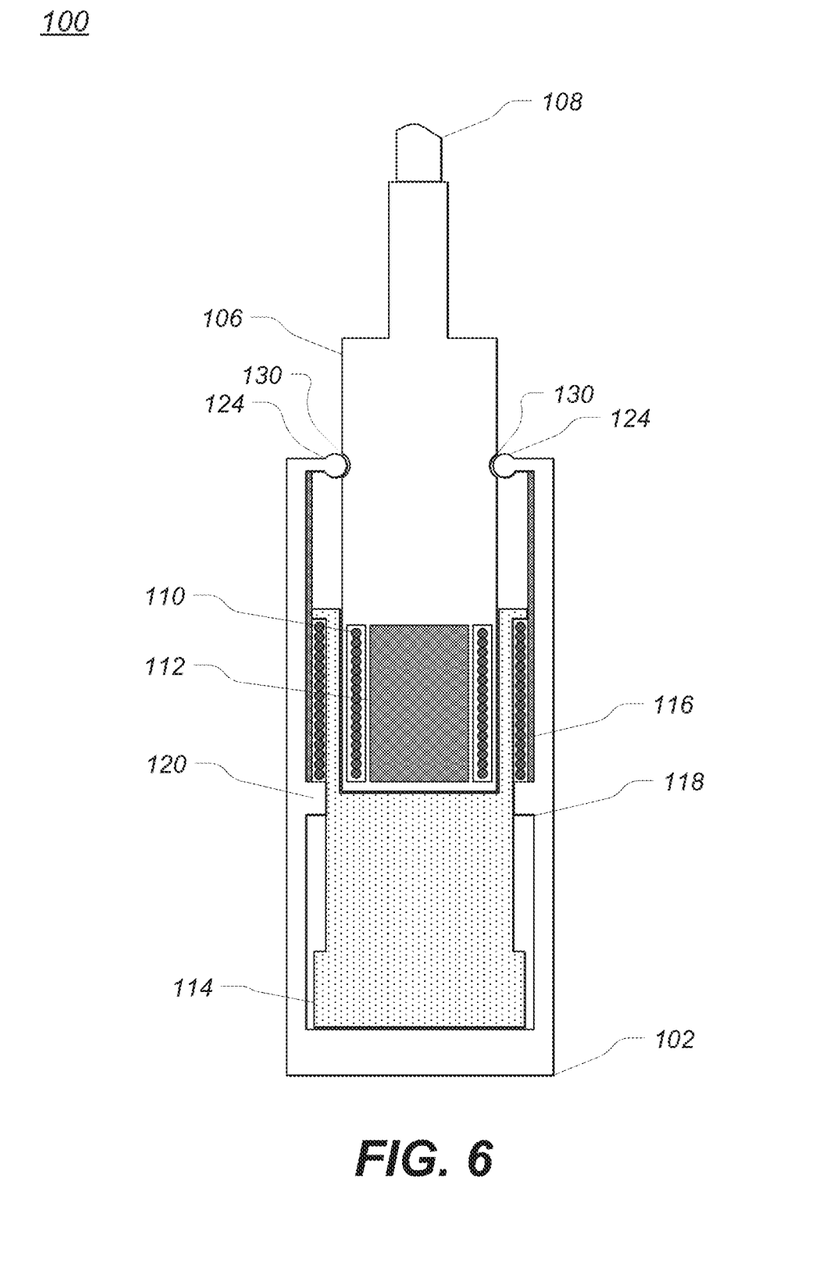
FIG. 6 depicts a side cross section view of an example electrical connector system related to the example electrical connector system as shown in FIG. 1 taken along line 2-2, showing an example latch for retaining an insert within a receptacle.

FIG. 6 depicts a side cross section view of an example electrical connector system 100 related to the example electrical connector system as shown in FIG. 1 taken along line 2-2, showing an example latch or retaining mechanism for retaining an insert within a receptacle. As shown, the connector 106 is received at least partially within the receptacle 104, causing a retraction of the retractable sheath 114 into the housing of the connector 102 which in turn may compress the inductive spring 116. In this manner, the cores of the inductive spring 116 and the inductive coil 110 may be aligned in inductive communication. In other words, the inductive spring 116 and the inductive coil 110 may be inductively coupled. Once the connector 106 is fully inserted into the second connector 102, a ring detent 124 coupled to the housing of the connector 102 may engage with a ring recess 130 within the housing of the connector 106. In this manner, the detent 124 may mechanically retain at least a portion of the connector 106 within the connector 102.

Figure 7:
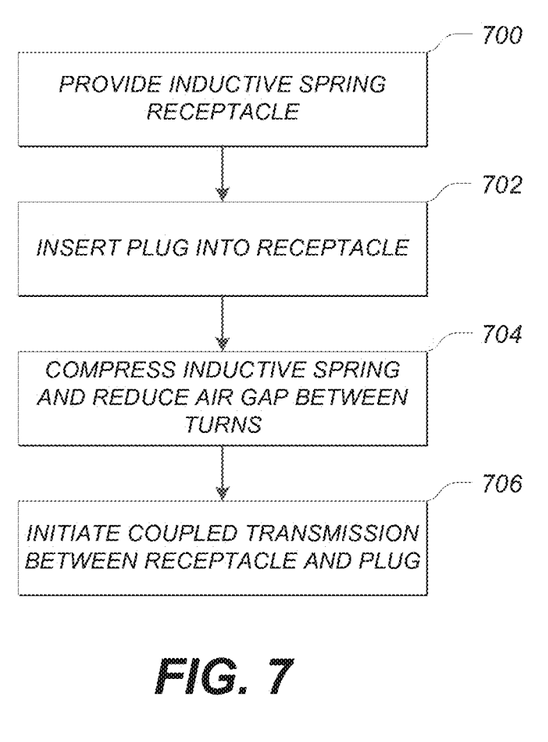
FIG. 7 depicts an example flow diagram of a method of using an electromagnetic coil for electrical coupling and as a component of a mechanical resistance mechanism.

FIG. 7 depicts an example flow diagram of a method of using an electromagnetic coil for electrical coupling and as a component of a mechanical resistance mechanism. The method may begin at step 700 by providing an inductive spring receptacle. At step 702, a plug containing an inductive coil may be inserted within the inductive spring receptacle. Next, the plug may be forcibly inserted into the receptacle such that the inductive spring compresses to reduce the air gap between the turns of the inductive spring at step 704. The inductive spring may be compressed to a particular selected dimension. In certain embodiments, the inductive spring may be compressed entirely or, in other examples, the inductive spring may be compressed partially.

Thereafter, inductive communication or transmission may be initiated between the inductive spring and the inductive coil at step 706. In certain embodiments, inductive communication may constitute inductive power transfer between the plug and the receptacle. In other embodiments, inductive power may be transferred from the plug to the receptacle. In still further embodiments inductive power may be transferred from the receptacle to the plug. In still further examples, the plug and receptacle may exchange power.

In other embodiments, inductive transmission may constitute inductive data transfer between the plug and the receptacle. In some examples, data transfer may be one way or, in other examples, data transfer may be two way.

Figure 8:
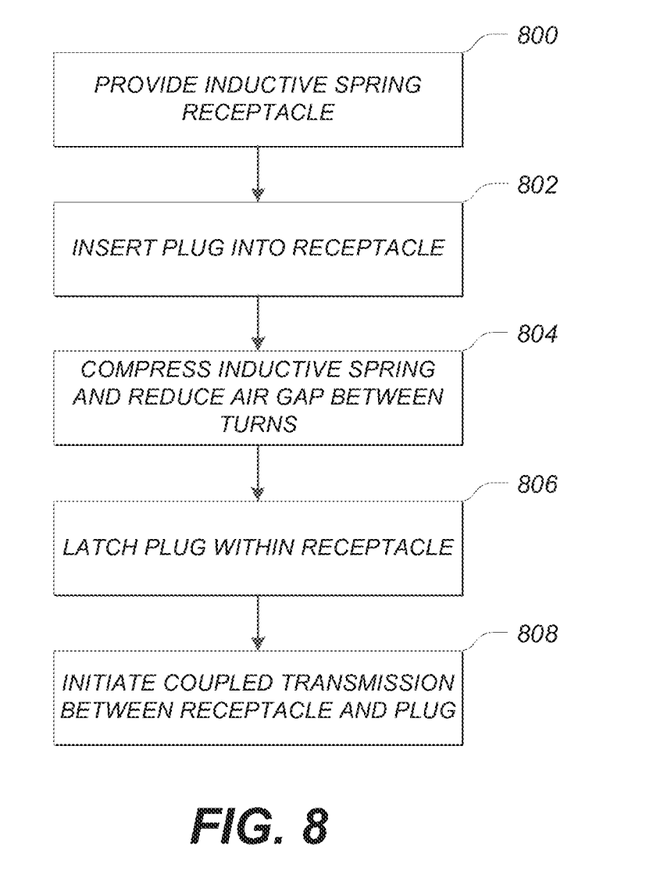
FIG. 8 depicts an example flow diagram of a method of using an electromagnetic coil for electrical coupling and as a component of a mechanical latching mechanism.

FIG. 8 depicts an example flow diagram of a method of using an electromagnetic coil for electrical coupling and as a component of a mechanical latching mechanism. As with the method of FIG. 7, the method may begin at step 800 by providing an inductive spring receptacle. At step 802, a plug containing an inductive coil may be inserted within the inductive spring receptacle. Next at 804, the plug may be forcibly inserted into the receptacle such that the inductive spring compresses to reduce the air gap between the turns of the inductive spring. Next, the plug may be latched within the receptacle at 806. The latching may mechanically retain the plug within the receptacle 802.

For example, the plug may be latched with a push-push mechanism or, in other embodiments, the plug may be latched by alignment of a detent and a detent recess respectively present upon the housings of the plug and receptacle. Thereafter, inductive communication or transmission may be initiated between the inductive spring and the inductive coil at step 806. As noted with respect to the method presented in FIG. 7, inductive communication and transmission may constitute exchange or transfer of inductive power or data. The exchange or transfer may be one-way or two-way.

Figure 9:
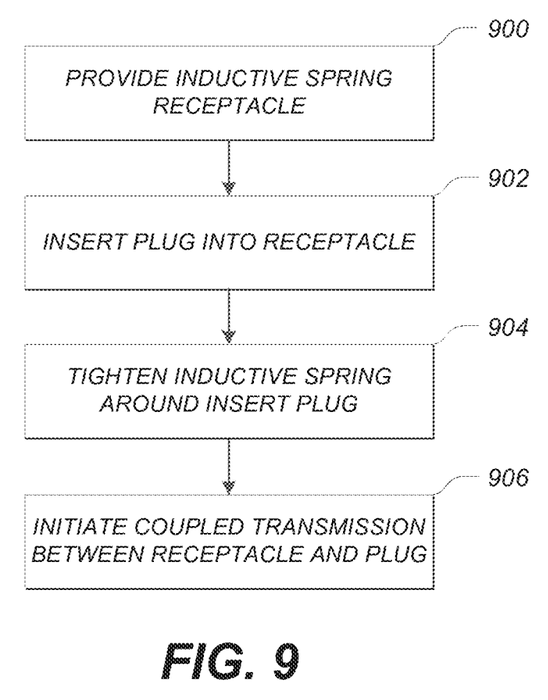
FIG. 9 depicts an example flow diagram of an additional method of using an electromagnetic coil for electrical coupling and as a component of a mechanical latching mechanism.

FIG. 9 depicts an example flow diagram of an additional method of using an electromagnetic coil for electrical coupling and as a component of a mechanical latching mechanism. The method may begin at step 900 by providing an inductive spring receptacle. At step 902, a plug containing an inductive coil may be inserted within the inductive spring receptacle. Next, the plug may be forcibly rotated in the receptacle such that the inductive spring tightens around the plug at step 904. The inductive spring may be compressed to a particular selected dimension. In certain embodiments, the inductive spring may be tightened entirely or, in other examples, the inductive spring may be tightened partially. Tightening of the inductive coil may reduce the diameter of the cross section. Thereafter, inductive communication or transmission may be initiated between the inductive spring and the inductive coil at step 906.

One may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

I claim:

1. An electrical connector system comprising:
a first connector comprising:
an insert portion; and
a first electromagnetic coil positioned within the insert portion;
a second connector comprising:
a receptacle sized to receive the insert portion of the first connector; and
a second electromagnetic coil configured to compress to a first selected dimension in response to receiving the insert portion within the receptacle;
wherein the first selected dimension is based at least in part on a mutual inductance characteristic between the first electromagnetic coil and the second electromagnetic coil when the insert portion is received in the receptacle.

2. The connector system of claim 1, wherein the second connector further comprises a latch configured to retain the first connector within the receptacle of the second connector.

3. The connector system of claim 2, wherein the first connector further comprises a recess for receiving the latch of the second connector.

4. The connector system of claim 2, wherein the latch comprises a push-push mechanism.

5. The connector system of claim 1, wherein the electromagnetic coil of the first connector is configured to compress to a selected dimension in response to insertion into the receptacle; and
wherein the selected dimension is based at least in part on a mutual inductance characteristic between the first electromagnetic coil and the second electromagnetic coil when the insert portion is received in the receptacle.

6. The connector system of claim 1, wherein the electromagnetic coil of the first connector and the electromagnetic coil of the second connector are adapted for inductive power transfer when the insert portion is received in the receptacle.

7. The connector system of claim 1, wherein the electromagnetic coil of the first connector and the electromagnetic coil of the second connector are adapted for electromagnetic signal transfer when the insert portion is received in the receptacle.

8. The connector system of claim 1, wherein each of the insert portion and the receptacle are cylindrical.

9. A method of electromagnetic transmission comprising:
positioning a first electromagnetic coil inductively proximate a second electromagnetic coil;
compressing the second electromagnetic coil to a selected dimension; and
varying a magnetic field in the first electromagnetic coil;
wherein the selected dimension is based at least in part on a mutual inductance characteristic between the first electromagnetic coil and the second electromagnetic coil when the second electromagnetic coil is compressed.

10. An electrical connector system comprising:
a first connector comprising:
a housing; and a first electromagnetic coil positioned within the housing and configured to compress to a first selected dimension in response to a compressive force applied to the housing;

a second connector comprising:
- a receptacle sized to receive the housing of the first connector; and
- a second electromagnetic coil positioned around the receptacle;

wherein the first selected dimension is based at least in part on a mutual inductance characteristic between the first electromagnetic coil and the second electromagnetic coil when the insert portion is received in the receptacle.

11. The connector system of claim 10, wherein the second connector further comprises a latch configured to retain the first connector within the receptacle of the second connector.

12. The connector system of claim 11, wherein the first connector further comprises a recess for receiving the latch of the second connector.

13. The connector system of claim 11, wherein the latch comprises a push-push mechanism.

14. The connector system of claim 10, wherein the electromagnetic coil of the first connector and the electromagnetic coil of the second connector are adapted for inductive power transfer when the housing is received in the receptacle.

15. The connector system of claim 10, wherein the electromagnetic coil of the first connector and the electromagnetic coil of the second connector are adapted for electromagnetic signal transfer when the housing is received in the receptacle.

16. The connector system of claim 10, wherein the housing and the receptacle are cylindrical.

17. The method of claim 9, further comprising at least temporarily fixing the position of the first electromagnetic coil relative to the second electromagnetic coil.

18. A method of electromagnetic transmission comprising:
- positioning a first electromagnetic coil within a second electromagnetic coil;
- tightening the second electromagnetic coil to a selected diameter so as to at least partially restrain the first electromagnetic coil within the second electromagnetic coil;
- varying a magnetic field in the first electromagnetic coil to induce a voltage within the second electromagnetic coil;
- loosening the second electromagnetic coil;
- removing the first electromagnetic coil from the second electromagnetic coil.

19. The method of claim 9, wherein the first electromagnetic coil is disposed within a housing; and
the second electromagnetic coil is disposed within a receptacle sized to receive the housing.

20. The method of claim 9, wherein the second electromagnetic coil comprises a copper alloy.

21. The method of claim 17, wherein fixing the position of the first electromagnetic coil relative to the second electromagnetic coil comprises latching the first electromagnetic coil with a latch mechanism.

22. The method of claim 21, wherein the latch mechanism comprises a push-push mechanism.

23. The method of claim 17, wherein fixing the position of the first electromagnetic coil relative to the second electromagnetic coil comprises rotatably tightening the second electromagnetic coil around the first electromagnetic coil.

* * * * *